July 6, 1926.
W. A. MARTIN
CULTIVATOR
Filed Sept. 4, 1925
1,591,925
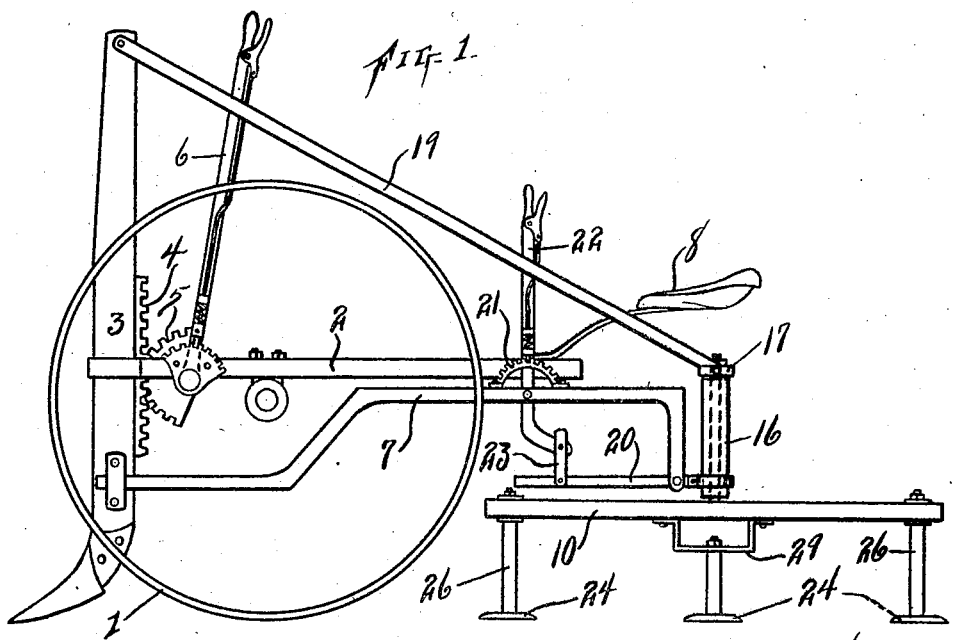
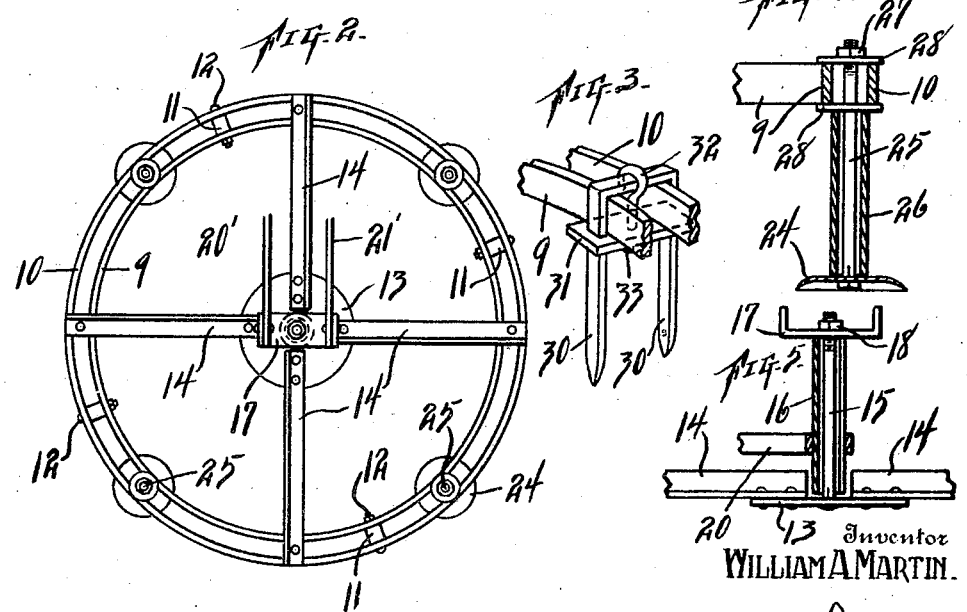
Inventor
WILLIAM A. MARTIN.
By A. L. Jackson
Attorney Patented July 6, 1926.

1,591,925

UNITED STATES PATENT OFFICE.

WILLIAM A. MARTIN, OF FORT WORTH, TEXAS.

CULTIVATOR.

Application filed September 4, 1925. Serial No. 54,393.

My invention relates to cultivators and more particularly to a rotating cultivator for stirring and scarifying the surface of the earth or land; and the object is to provide attachments which can be attached to a variety of wheeled vehicles or carriers which can be used for cultivating and thinning different kinds of crops, such as cotton, corn, milo maize, sorghum, sugar beets, and other young plants which require thinning and thorough working, and to provide means for manual control of the operating devices. Other objects and advantages will be fully explained in the following description and the invention will be more particularly pointed out in the claims.

Reference is had to the accompanying drawings which form a part of this application.

Fig. 1 is a side elevation of the improved cultivating devices, showing sufficient parts of a wheeled carrier for illustrating the improvements.

Fig. 2 is a plan view of the operating devices.

Fig. 3 is a perspective view of one of the scarifiers, showing the manner of mounting and adjusting the same.

Fig. 4 is a detail view of one of the cultivators shown in section.

Fig. 5 is a detail sectional view, showing the construction of the devices for mounting the rotary spindle.

Similar characters of reference are used to indicate the same parts throughout the several views.

The drawings show a wheel 1 and a portion 2 of a cultivator frame which is connected to the axle of the cultivator. The cultivator is provided with a vertically adjustable standard and draft beams operatively connected to the standard. The cultivator standard 3 has a rack 4, sector gear 5, lever 6, and connecting parts. A pair of traction members or draw beams 7 are attached to the standard 3, one member on each side thereof. A seat 8 is attached to the frame 2.

The operating mechanism includes a circular frame having inner member 9 and outer member 10. The members 9 and 10 are spaced apart by blocks 11 and bolts 12 secure the blocks 11 in place and secure the members 9 and 10 in their spaced relation. Means are provided for suspending the operating frame. A circular bearing disk 13 and bars 14 are attached to the frame. The bars 14 are preferably angle bars. A spindle bolt 15 is secured to the plate 13. A sleeve 16 is mounted on the plate 13 about the spindle 15 and secured thereon by a bracket 17 and nut 18. A brace 19 consisting of members 20' and 21' is rigidly connected to the bracket 17 and at the upper end the brace is connected to the vertically adjustable plow standard 3 which serves as a support for the brace 19. An arm 20 is rigidly clamped on the sleeve 16 and this arm 20 is pivotally connected to the draft beams 7. When the standard 3 is adjusted vertically, the working frame 9—10 will be adjusted also.

Means are provided for the horizontal adjustment of the frame 9—10 when assembling the cultivator. A segment rack 21 is attached to the draft beams 7 and a lever 22, provided with a spring-actuated dog, is fulcrumed on the beam 7. An upstanding lug 23 is attached to the arm 20. The lever 22 is pivotally connected to the lug 23. The standard 3, beams 7, brace 19, sleeve 16, bar 20 and the cultivator frame are all elevated and maintained at any desired position by the lever 6.

Disk plows 24 are attached to the working frame, as shown in Fig. 4. Spindles 25 are rigidly connected to the plows 24 and then hung on the operating frame 9—10 rigidly therewith by means of the plates 28, nut 27, and sleeve 26. There may be as many of the disk plows 24 as may be required. The central disk 24 is connected by similar means to a bracket 29, which is connected to the plate 13 and arms 14. The frame 9—10 is thus rotatably mounted and the disk plows 24 will do their work when the plow is drawn across the field. The plows 24 will never become choked because the frame 9—10 will yield and let the plow which becomes clogged turned to the rear so that whatever is hung on the disk will be thrown off.

Fig. 3 illustrates plowing implements which may be substituted for the disks 24.

The scarifiers 30 are attached to the frame 9—10 by a plate 31 which is perforated near the ends to receive the scarifiers 30 which are hung on the frame. The plate 31 is hung on the frame by a hooked bolt 32 and a nut 33 is screwed on the lower end of the bolt 32 to clamp the plate 31 against the frame and to pull the bend of the arms 30 down on the frame 9—10.

What I claim, is:—

1. In a cultivator provided with a plow standard and draft beams attached thereto and supported thereby and extending rearwardly therefrom; a rotatable spindle and a bearing therefor supported by said beams, a circular carrying frame carried by said spindle and automatically rotatable in either direction, a brace bar operatively connected with said standard and said spindle bearing, and cultivating devices carried by said frame.

2. In a cultivator provided with a plow standard and draft beams attached thereto and supported thereby and extending rearwardly therefrom; a vertically disposed spindle and a bearing therefor supported by said beams, a brace bar operatively connected to said standard and to said bearing and co-operating with said beams to support the same, a horizontally disposed circular carrying frame carried by said spindle and automatically rotatable in either direction by the work to be done, and cultivating devices carried by said frame.

3. In a cultivator provided with a plow standard and draft beams attached thereto and supported thereby and extending rearwardly therefrom, a vertically disposed spindle, a bearing for said spindle supported at its upper end from said standard and supported at its lower end by said beams, a circular horizontally disposed carrying frame carried by said spindle automatically rotatable in either direction, and cultivating devices carried by said frame.

4. In a cultivator provided with a plow standard and draft beams attached thereto and supported thereby and extending rearwardly therefrom, a vertically disposed spindle, a bearing for supporting said spindle, a brace attached to said standard and provided with a bracket for supporting said bearing, means carried by said beams for supporting the lower end of said bearing, a circular horizontally disposed automatically rotatable carrying frame carried by said frame, and cultivating devices carried by said frame.

5. In a cultivator provided with a plow standard and draft beams attached thereto and supported thereby and extending rearwardly therefrom, a vertically disposed spindle, a bearing for said spindle, a brace attached to said standard and provided with a bracket for supporting said bearing at its upper end, adjustable means for supporting the lower end of said bearing from said beams, a circular horizontally disposed automatically rotatable carrying frame operatively connected to said spindle, and cultivating devices carried by said frame.

In testimony whereof, I set my hand, this 28th day of August, 1925.

WILLIAM A. MARTIN.